(12) United States Patent
Trees

(10) Patent No.: US 11,317,613 B1
(45) Date of Patent: May 3, 2022

(54) FISH ASSIST

(71) Applicant: Alan Thomas Trees, Pollock, CO (US)

(72) Inventor: Alan Thomas Trees, Pollock, CO (US)

( * ) Notice: Subject to any disclaimer, the term of this patent is extended or adjusted under 35 U.S.C. 154(b) by 0 days.

(21) Appl. No.: 17/481,488

(22) Filed: Sep. 22, 2021

(51) Int. Cl.
*A01K 87/00* (2006.01)
*A01K 99/00* (2006.01)
*A01K 97/00* (2006.01)

(52) U.S. Cl.
CPC ............ *A01K 87/008* (2022.02); *A01K 87/00* (2013.01); *A01K 97/00* (2013.01); *A01K 99/00* (2013.01)

(58) Field of Classification Search
CPC ...... A01K 87/007; A01K 87/08; A01K 87/00; A01K 97/00; A01K 99/00; A01K 97/12; A01K 97/125
USPC ................................ 43/25, 4, 18.1 R, 23, 17
See application file for complete search history.

(56) References Cited

U.S. PATENT DOCUMENTS

| | | | | |
|---|---|---|---|---|
| 2,297,577 A * | 9/1942 | Monte | ..................... | A01K 87/00 43/23 |
| 3,570,164 A * | 3/1971 | Tozier | ..................... | A01K 87/00 43/18.1 R |
| 3,624,849 A * | 12/1971 | Brannaker | .............. | B63B 22/10 441/8 |
| 3,973,348 A * | 8/1976 | Shell | ..................... | A01K 87/085 43/23 |
| 4,014,129 A * | 3/1977 | Capra | ..................... | A01K 87/08 43/23 |
| 4,041,635 A * | 8/1977 | Savage | .................. | A01K 87/08 43/25 |
| 4,709,500 A * | 12/1987 | Yasumiishi | ............ | A01K 97/12 43/17 |
| 4,944,111 A * | 7/1990 | Daniel | ................... | A01K 97/06 43/25.2 |
| D327,726 S * | 7/1992 | Lowrance | ..................... | D22/139 |
| 5,355,611 A * | 10/1994 | Dahlberg | ............... | A01K 87/00 43/21.2 |
| 5,369,904 A * | 12/1994 | Vogts | ..................... | A01K 87/00 43/18.1 R |
| D363,529 S * | 10/1995 | Nordstrom | ................... | D22/134 |
| 5,503,579 A * | 4/1996 | Curran | ................... | A01K 87/00 43/18.1 R |
| 5,535,539 A * | 7/1996 | Vetre | ....................... | A01K 87/08 43/18.1 R |
| 5,551,184 A * | 9/1996 | Grosse | .................... | A01K 87/00 43/21.2 |
| 5,581,931 A * | 12/1996 | Swisher | ................. | A01K 87/08 43/21.2 |
| 5,592,773 A * | 1/1997 | Perry | ..................... | A01K 87/00 43/25 |
| 5,655,328 A * | 8/1997 | Childs | .................. | A01K 87/085 219/535 |
| 5,862,622 A * | 1/1999 | Sandman | ............. | A01K 87/007 43/25 |
| 5,915,943 A * | 6/1999 | Grice | ..................... | A01K 87/00 43/25 |

(Continued)

FOREIGN PATENT DOCUMENTS

WO WO-2017141153 A1 * 8/2017 ............. A01K 87/08

*Primary Examiner* — Darren W Ark

(74) *Attorney, Agent, or Firm* — Adam Warwick Bell; Matthew Rupert Kaser

(57) ABSTRACT

A fishing rod accessory that attaches to the external structure of a fishing rod between the fishing rod tip and the fishing rod handle that will help stabilize the fishing rod spine and will improve targeted casting, distance, and accuracy.

10 Claims, 7 Drawing Sheets

(56) References Cited

U.S. PATENT DOCUMENTS

| | | | | |
|---|---|---|---|---|
| 6,347,477 | B1* | 2/2002 | Hopper | A01K 87/08 242/281 |
| 6,360,475 | B1* | 3/2002 | Lepage | A01K 87/00 43/18.1 R |
| 6,397,511 | B1* | 6/2002 | Atnip | A01K 87/007 43/22 |
| 6,427,678 | B1* | 8/2002 | Trzeciak | A01K 87/085 126/204 |
| 6,694,666 | B2* | 2/2004 | Iwabuchi | A01K 87/08 43/25 |
| 6,763,628 | B1* | 7/2004 | Bartlett | A01K 87/08 43/18.1 R |
| 7,444,777 | B2* | 11/2008 | Keys | A01K 87/08 16/110.1 |
| 7,784,214 | B2* | 8/2010 | Mullane | A01K 87/06 43/22 |
| 8,753,233 | B2* | 6/2014 | Lay | A63B 69/0075 473/451 |
| 9,861,088 | B1* | 1/2018 | Fuchsius | B60R 9/08 |
| 2002/0017050 | A1* | 2/2002 | Irrgang | A01K 87/08 43/18.1 R |
| 2003/0089022 | A1* | 5/2003 | Costephens | A01K 87/08 43/25 |
| 2005/0072037 | A1* | 4/2005 | Markley | A01K 87/08 43/23 |
| 2005/0257416 | A1* | 11/2005 | Nyland | A01K 87/08 43/21.2 |
| 2006/0075675 | A1* | 4/2006 | Goretti | A01K 97/125 43/17 |
| 2006/0230669 | A1* | 10/2006 | Markley | A01K 87/08 43/23 |
| 2007/0220799 | A1* | 9/2007 | Burns, III | A01K 87/08 43/23 |
| 2008/0120893 | A1* | 5/2008 | Keys | A01K 87/08 43/21.2 |
| 2008/0172922 | A1* | 7/2008 | Mullane | A01K 87/06 43/22 |
| 2017/0367309 | A1* | 12/2017 | Morris | A01K 87/007 |
| 2018/0352794 | A1* | 12/2018 | Shiflett, Jr. | A01K 97/10 |
| 2020/0187474 | A1* | 6/2020 | Webber | A01K 89/01925 |
| 2021/0378221 | A1* | 12/2021 | Bagautdinov | A01K 97/00 |

* cited by examiner

FISH ASSIST

FIELD OF THE INVENTION

This invention relates in general to fishing rod accessories. More specifically, the invention pertains to systems used for controlling or influencing the movement, distance, stabilization, and accuracy of casting a fishing lure, fishing bait, fishing hook, fishing bobber, fishing weight or combination thereof when a person is casting such items attached to a fishing line from a fishing rod; further the invention is an anti-fatigue device influencing a reduction in the stress and strain incurred on the human body such as hand, wrist, arm, muscles and tendons wear during casting application of a fishing rod. Many times, with fishing there is a repetitive motion of casting and reeling, this is especially true in most fishing tournaments and during a prolonged day of fishing when using fishing lures such as artificial baits that require continuous casting and action.

Other types of fishing require casting of fishing weights attached to a fishing line in addition to a fishing bait and fishing hook. The frequent casting of a fishing rod or simply the act of casting a fishing rod while using additional weights creates stress and strain on the human body including the hands, arms, wrists, legs, joints, muscles and other tendinous parts. The higher the number of casts the more stress and strain on the human body. The Fish Assist fishing rod accessory is designed to reduce the stress and strain transferred to the user when casting fishing lures, baits, hooks, weights, or a combination thereof from a fishing rod thereby allowing the person fishing to fish longer. In addition, the Fish Assist fishing rod accessory is designed to improve casting distance and accuracy, smooth out the casting experience, reduce line friction and drag, all with less stress impact on the human body.

DESCRIPTION OF THE PRIOR ART

Most fishing rods are typically comprised of a fishing rod with "tip" and 'butt' (handle) section on which a fishing reel is mounted. Most fishing rods are operated with casting and retrieval techniques.

During use, the fishing rod is cast such that the fishing lure, fishing bait, fishing hook, fishing weight or combination thereof is directed towards the intended target (example: towards the desired position in the water being fished). During casting, the fishing rod is swung backwards relative to the angler, such that at least the rod tip bends backwards in the opposite direction of the casting direction. The fishing rod is then swung forwards in the casting direction.

Many fishing rods are constructed such that the whole of the fishing rod bends or flexes to some degree. In many fishing rods the degree of bend and flex is typically greatest across the top half of the fishing rod; (from the tip of the fishing rod to the middle of the fishing rod).

In many types of fishing, particularly in bait casting fishing, it is desirable and advantageous for the angler to be able to repeatedly cast the lure accurately on the same target. In some types of fishing, such as spin casting and surf fishing, it is desirable and advantageous to be able to cast the fishing lure, fishing bait, fishing weight, fishing hook, fishing bobber or combination thereof a long distance.

It is the object of the invention to provide an improved method and apparatus with desirable properties that overcomes the shortcomings of the prior art.

BACKGROUND OF THE INVENTION

The present invention relates to devices configured to cast and reel in a fishing line with a lure, bait, hook, weight (sinkers), bobber, or combination thereof attached to the end of the fishing line, e.g., fishing rods. More specifically, the present invention relates to devices used during the casting application of a fishing rod to improve stabilization, accuracy, distance, and efficiency while simultaneously acting as an anti-fatigue device reducing the stress and strain impact on the human body more specifically the hand, wrist, arm and tendons wear during prolonged casting application.

Current casting devices, e.g., fishing rods, have limited casting accuracy and casting distance based on the fishing rod design itself, the lure, bait, weight (sinkers), hook, bobber, or combination being used and the physical ability of the user. Current casting devices, example: fishing rods by the motion of casting when the fishing rod is brought backward and then swung forward in a casting motion causes a quantifiable measure of stress on the user's body. Therefore, there is a need in the prior art for an accessory for the standard fishing rod that provides users with the means to cast a lure, bait, weight (sinker), hook, bobber, or combination thereof with increased accuracy, distance, and efficiency while simultaneously reducing stress and strain on the human body during the casting application.

BRIEF DESCRIPTION OF THE INVENTION

On a fishing rod, the improvement comprising a stabilization, dampening and anti-fatigue fishing rod accessory comprising: a device which can be made in various shapes, sizes and from a variety of materials including but not limited to aluminum, rubber, steel, plastic, carbon fiber, graphite, fiberglass, wood, silicone, or any combination, said device mountable externally, to the fishing rod and comprising a connector which is built into the fish assist accessory device or as a separate connector, said connector to securely attached the fishing rod accessory to the fishing rod.

KEY

Figure 1:
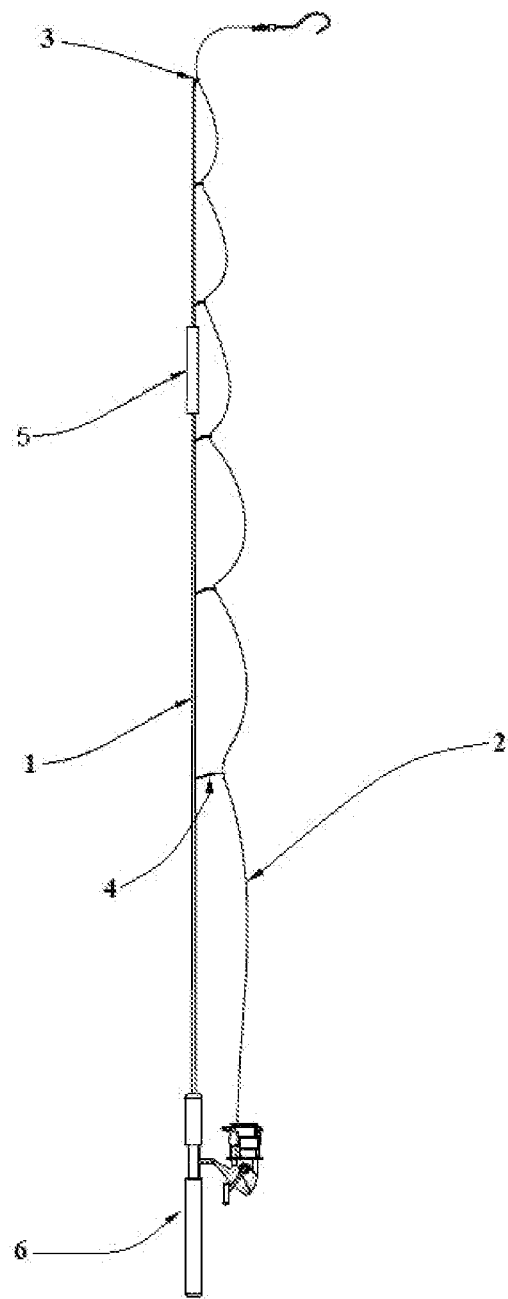
FIG. 1 shows schematically the fish assist fishing rod accessory (5) mounted on a rod.
Figure 2:
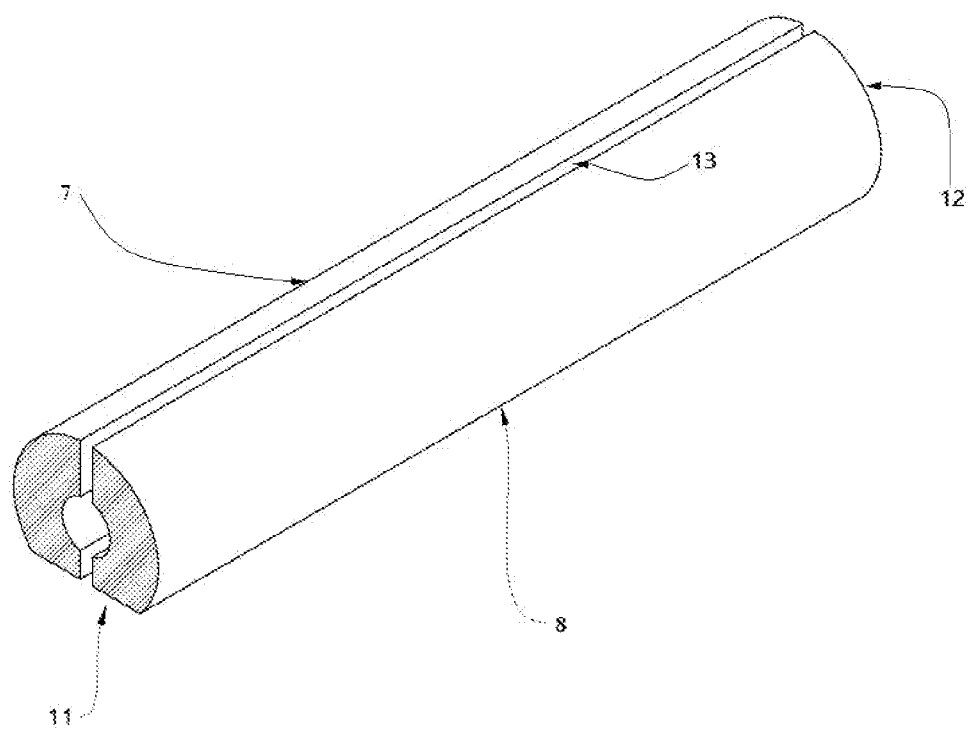
FIG. 2 shows the fish assist fishing rod accessory enlarged and partially cut away to show the end view and reveal a damping element used in the present invention.
Figure 3:
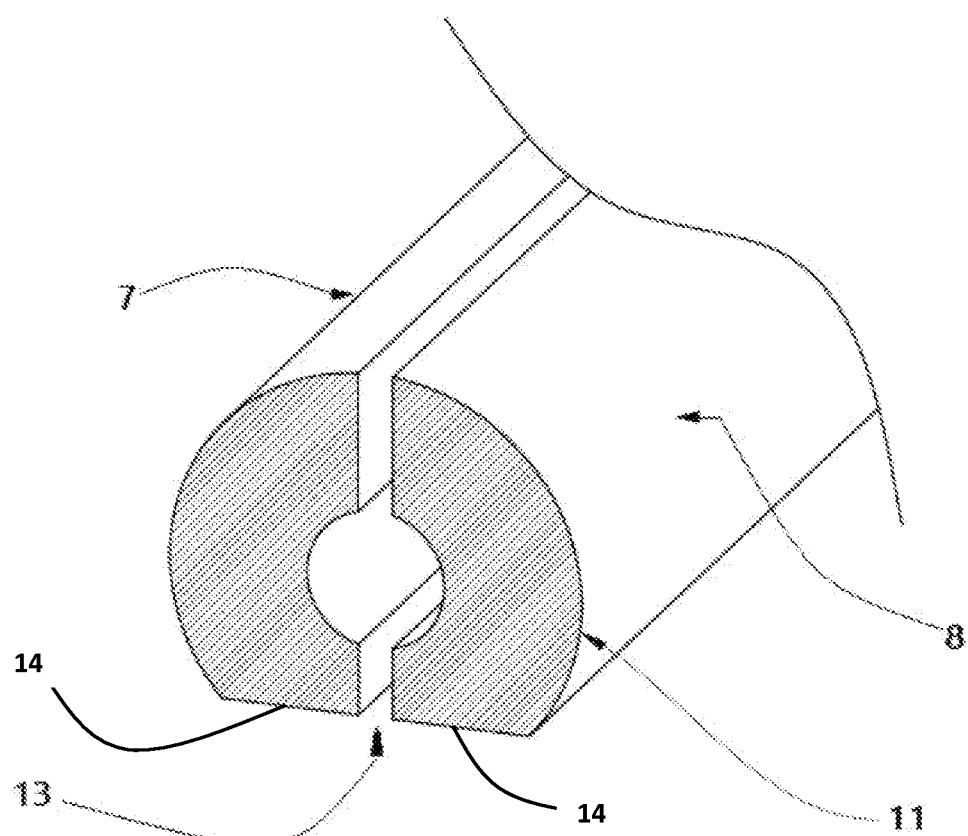
FIG. 3 shows a cut-away cross section of the fish assist fishing rod accessory.
Figure 4:
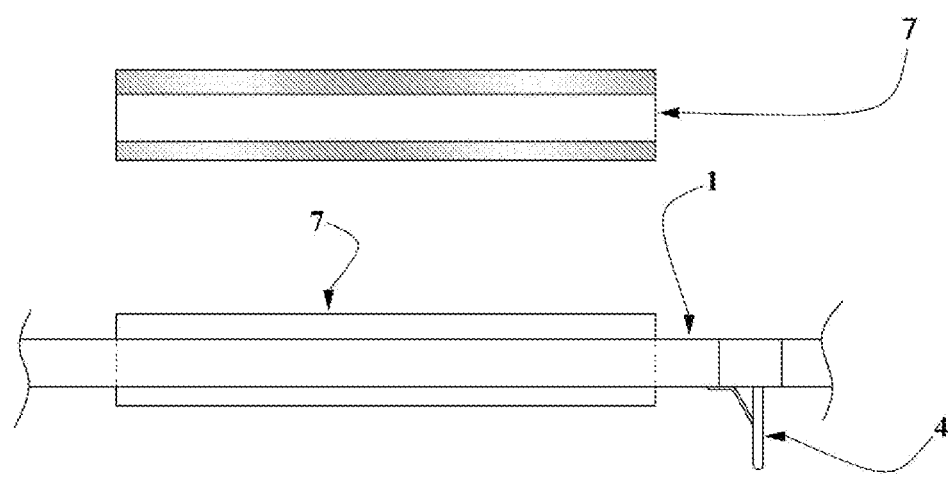
FIG. 4 shows the fish assist fishing rod accessory mounted to the external structure of a portion of the fishing rod showing the damping element in greater detail.
Figure 5:
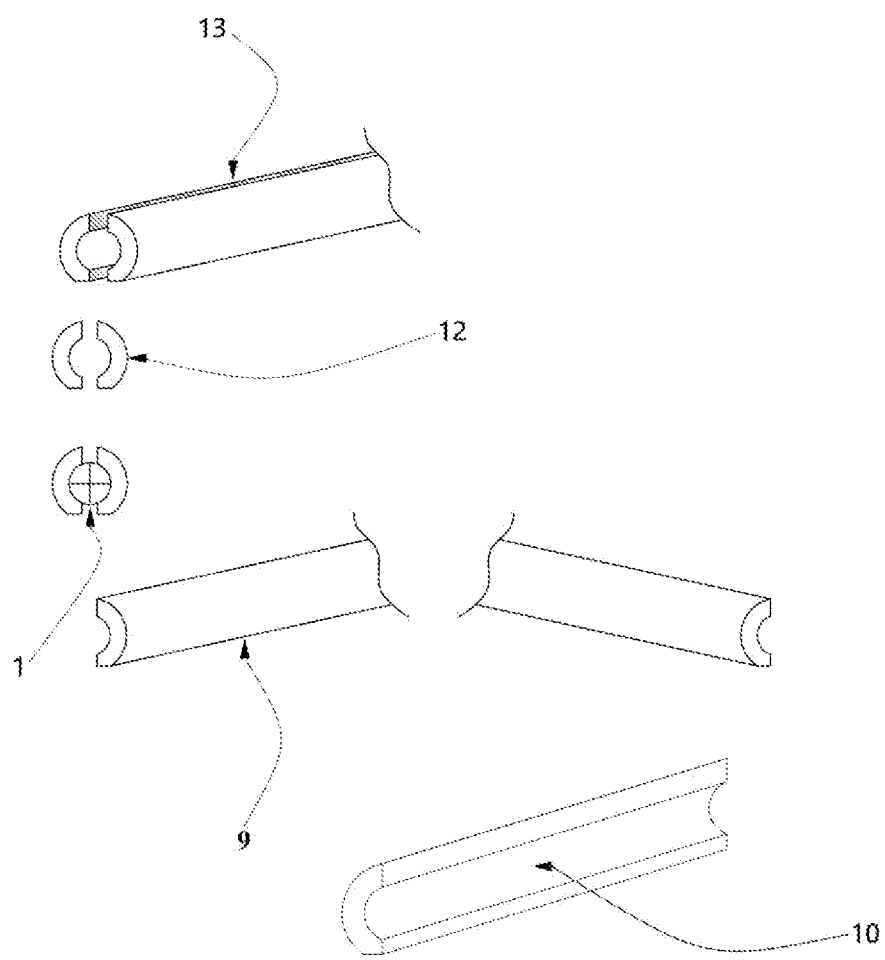
FIG. 5 shows various cut-away elements of the fish assist fishing rod accessory including bottom end and split.
Figure 6:
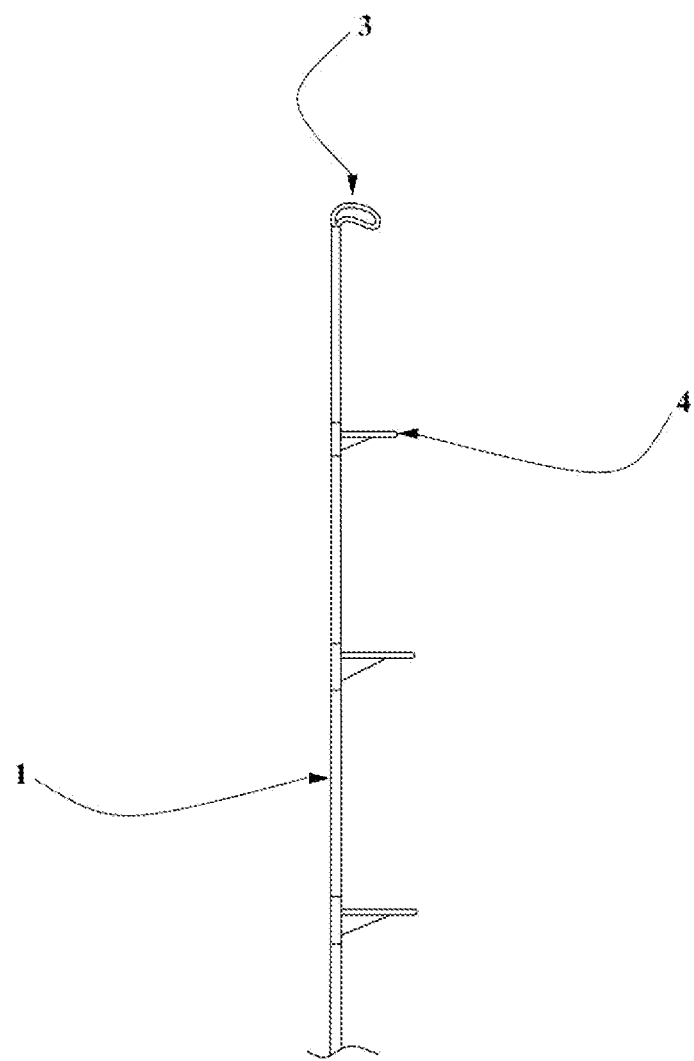
FIG. 6 shows the location of the rod tip and eyelets of the rod.
Figure 7:
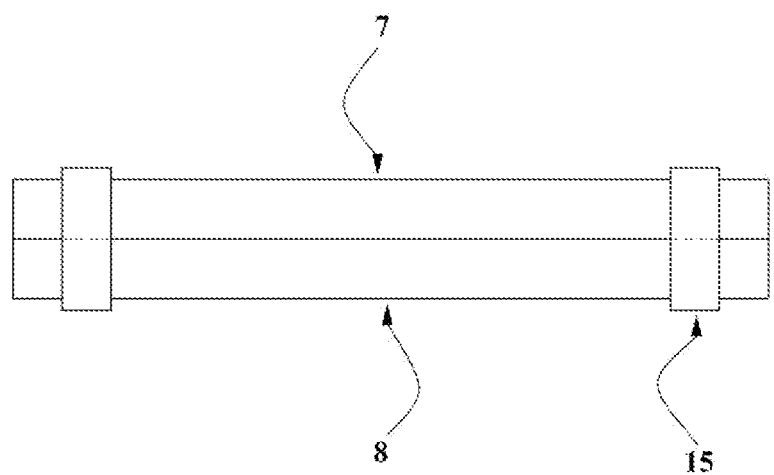
FIG. 7 shows the first elongated tubular section, second elongated tubular section, and connection means.

1 fishing rod
2 fishing line
3 fishing rod tip
4 fishing line eyelets
5 fish assist
6 fishing rod handle
7 first elongated tubular section
8 second elongated tubular section
9 elongated outer surface
10 elongated inner surface defining a cylindrical void

11 top end
12 bottom end
13 lengthwise split
14 partially flattened face traversing an arc of the elongated outer surface of both the first and second elongated tubular sections
15 connection means

DETAILED DESCRIPTION OF THE INVENTION

Applicants have found that a fish assist fishing rod accessory that attaches to the external structure of a fishing rod between the fishing rod tip and the fishing rod handle will help stabilize the fishing rod spine and will improve targeted casting, distance, and accuracy by decreasing the effects of the fishing rod's excessive flexing, wiggling, and vibration also referred to as "noodling" during the process of casting a fishing rod. Excessive flexing, wiggling, and noodling are a negative effect when casting a fishing rod which results in line friction and loss of stabilization affecting distance and accuracy. Further in accordance with the invention the Fish Assist fishing rod accessory is an anti-fatigue device that imparts less strain and stress on the human body during each casting motion.

Such casting improvement and anti-fatigue for the user during the casting application from the fishing rod can be achieved by attaching the fish assist fishing rod accessory externally to the fishing rod over a selected portion of its length, typically, but not always, to the first ten to twenty-five inches from the fishing rod tip. The accessory material is selected to stabilize the rod during casting by use of an external weight and support counterbalance reducing the excess flex, wiggle, vibration, and "noodling" effect of the fishing rod thereby improving accuracy and distance of the cast while simultaneously reducing stress and strain on the person casting.

Thus, in accordance with the invention, an externally mounted fishing rod accessory is provided having material incorporated into the accessory which is mounted externally to the fishing rod over a portion of its length.

Further in accordance with the invention, a fishing rod stabilization, anti-fatigue device, comprising: two sections of a tube, the first body section having an inside surface, a top end, a bottom end, and a front end; a second body section having an inside surface, a top end, a bottom end, and a front end; and a connector (example: shrink tube membrane) said connector will impart a pressing force to pull the inside facing tubular surfaces of the first and second body sections together, wherein the bottom ends and the front ends of the first and second body sections are configured to receive a fishing rod between the inside facing surfaces of the first and second body sections, wherein the first and second body sections are substantially identical in shape and configuration, with one long side of each section having a flat side, said flat side designed to face toward the fishing line on a fishing rod, and are positioned in a parallel orientation to each other, said connector, example: shrink tube membrane or other connector, being positioned over the exterior of the entire joined sections and extending onto the fishing rod to securely attach the joined sections to the fishing rod.

Further in accordance with the invention, a fishing rod accessory comprising two parts of a round tube cut in half along the long end of the tube with both of the tube halves having a flat portion along the entirety of one side. The two tube sections are placed on each side of the fishing rod at the same location on the fishing rod so that the fishing rod is in the middle of (sandwiched between) both sections of the tube. The flat portion of the tube is attached to the fishing rod facing the fishing line as it lays between the fishing rod eyelets. The flat portion of the tube sections allows for smooth and uninterrupted flow of the fishing line. The two tube halves (sections) are secured to the fishing rod using a connector, example: shrink tube membrane or another connector.

Although certain exemplary methods, apparatuses and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

Based on teachings herein, other configurations of tubular and other structures, external attachments and various connectors will be apparent to the skilled person as falling within the scope of the present invention.

Specific embodiments include the following:

Embodiment 1

A device for attachment to a fishing rod, which improves stabilization of the fishing rod while in use, the device comprising:

(i) a first elongated tubular section adapted to fit over the shaft of a fishing rod, having an elongated outer surface, an elongated inner surface defining a cylindrical void, a top end, and a bottom end, (ii) a second elongated tubular section adapted to fit over the shaft of a fishing rod, having an elongated outer surface, an elongated inner surface defining a cylindrical void, a top end, and a bottom end, wherein both the first and the second tubular sections are optionally split lengthwise, retaining their tubular shape, wherein, in use, the first and second elongated tubular sections are fitted onto the shaft of a fishing rod in line with each other along the axis of the rod, wherein the elongated outer surface of both the first and second elongated tubular sections have a partially flattened face traversing an arc of the elongated outer surface of both the first and second elongated tubular sections, said partially flattened face is adapted to face toward the fishing line when in use, in line with a plurality of fishing line eyelets of a fishing rod to which the device is attached, and wherein the first and second elongated tubular sections are flexibly connected via a connection means.

The tubular sections may be made from any suitable material such as plastic, metal, fabric, carbon fibre, nano-materials or composites, polymers and metal composites. The length of the tubular sections may be any suitable length for example from 4 inches to 12 inches in length, with a length to diameter ratio of for example from between 1:100 to 1:5. These dimensions and proportions are not meant to be limiting or exclusive.

Embodiment 2

In various embodiments, the connection means is flexible. It may be a hinge or a snap-fit connector. The connection means may be selected from the group consisting of a fabric connector, a plastic connector, a shrink-fit tube membrane, a foam material, and an elastic sheath. It can be a sheath made of a flexible and/or elastic material fitted over the first and second tubular sections and further extending over at least a portion of the rod. It can be made of any suitable material such as plastic, metal, fabric, carbon fibre, nanomaterials or composites. The connection means can be an integral and contiguous part of the first and the second tubular sections, connected to both to provide an area of enhanced flexibility.

Embodiment 3

In various embodiments, the first and second elongated tubular sections can be made from the group consisting of aluminum, rubber, steel, plastic, carbon, fiber, graphite, fiberglass, wood and silicone, or any combination thereof.

The device is adapted to be mounted on the external structure of a fishing rod.

The invention claimed is:

1. A method for casting, using a fishing rod configured to cast and reel in a fishing line with a lure or bait, a hook, a weight or a bobber, or a combination thereof attached thereto, wherein said method reduces flexing, wiggling, and vibration of the rod, the method comprising:
   (i) providing a fishing rod with a butt end, a tip end, and a reel both having a fishing line wound thereon and being attached to the fishing rod adjacent the butt end, the fishing rod and reel configured to cast and reel in the fishing line with a lure or bait, a hook, a weight or a bobber, or a combination thereof attached thereto, the fishing rod having a top half which is opposite the butt end and including a rod tip section having the tip end;
   (ii) securely attaching a stabilization device to said rod, on the top half of the fishing rod, within ten to twenty-five inches of the tip end of the fishing rod,
   wherein said stabilization device comprises two substantially identical body sections approximating two halves of a tube cut in half along a length thereof,
   wherein each of the two body sections is adapted to fit against the top half of the fishing rod within ten to twenty-five inches of the tip end of the fishing rod, and comprises an elongated semi-tubular body section, having a top end and a bottom end, an elongated outer surface, and an elongated inner surface defining a semi-cylindrical void which fits against the top half of the fishing rod,
   wherein each of the two body sections has a partially flattened face traversing an arc of the elongated outer surface, said partially flattened face is adapted to face toward the fishing line when in use, and wherein the two body sections are flexibly connected via a connection means;
   (iii) casting the fishing line by swinging the fishing rod backwards, such that at least the rod tip section bends backwards in an opposite direction of the casting direction, and then swinging the rod forwards in the casting direction;
   whereby said method results in reduction of flexing, wiggling, and vibration of the fishing rod during casting.

2. The method of claim 1 wherein, during casting, the degree to which the rod tip bends backwards in (iii) is greatest across the top half of the fishing rod.

3. The method of claim 1 wherein the connection means is selected from the group consisting of a fabric connector, a plastic connector, a shrink-fit tube membrane, and an elastic sheath.

4. The method of claim 1 of wherein the connection means is a snap-fit connector.

5. The method of claim 1 wherein the connection means comprises a sheath made of a flexible elastic material.

6. The method of claim 1 wherein the body sections are made from the group consisting of aluminum, rubber, steel, plastic, carbon, fiber, graphite, fiberglass, wood and silicone, or any combination thereof.

7. The method of claim 1 wherein the body sections are from 4 inches to 12 inches in length.

8. The method of claim 1 further repeating the step of (iii) casting the fishing line by swinging the fishing rod backwards, such that at least the rod tip bends backwards in the opposite direction of the casting direction, and then swinging the rod forwards in the casting direction.

9. The method of claim 1 wherein the stabilization device is attached to said rod within ten inches from the tip of the fishing rod.

10. The method of claim 1 wherein the stabilization device is attached to said rod within twenty-five inches from the tip of the fishing rod.

* * * * *